June 22, 1943.  R. B. KINZBACH  2,322,694
PIPE CUTTER AND REAMER
Filed Oct. 11, 1941   4 Sheets-Sheet 2

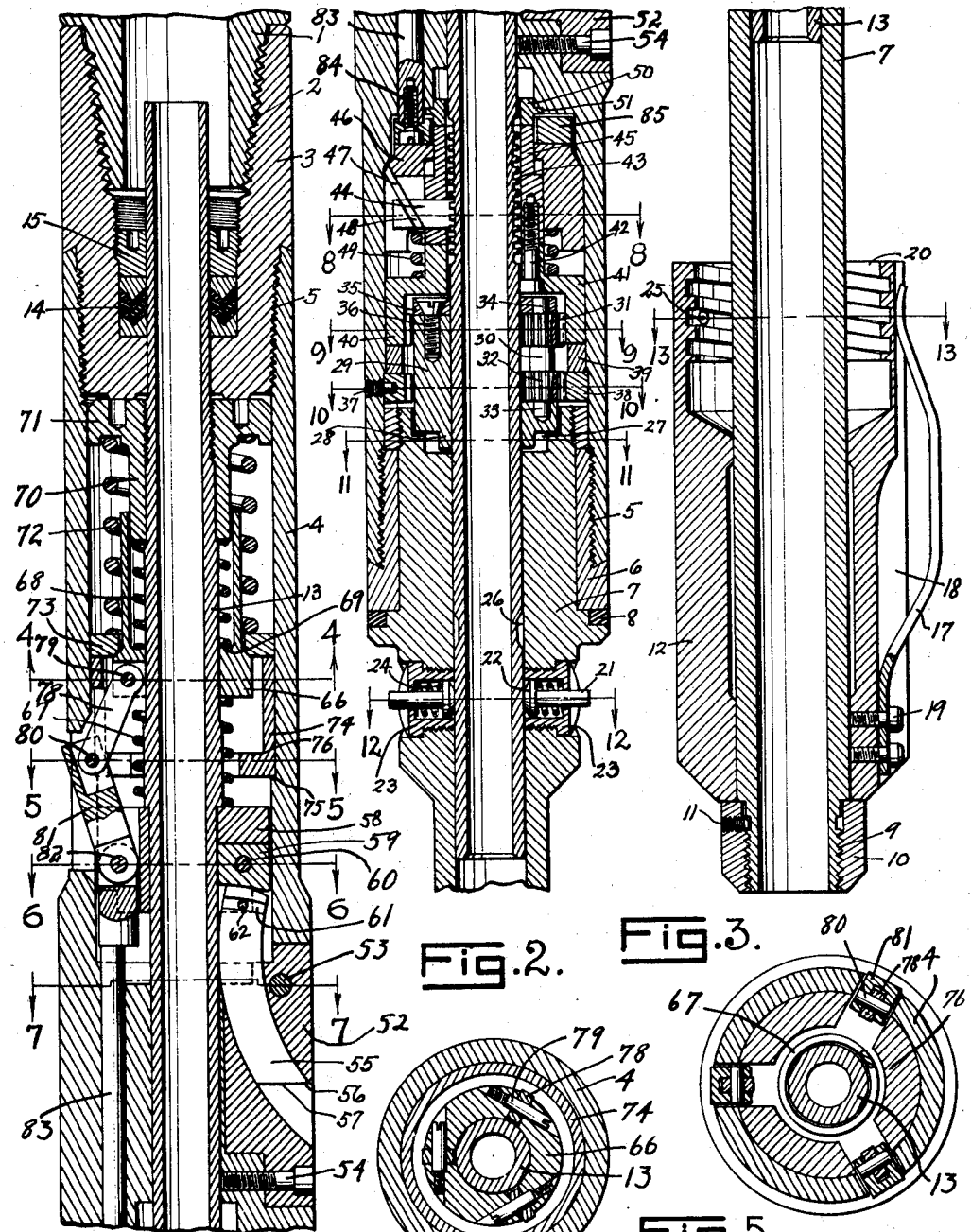

R. B. Kinzbach.
INVENTOR.
BY
ATTORNEYS

June 22, 1943.  R. B. KINZBACH  2,322,694
PIPE CUTTER AND REAMER
Filed Oct. 11, 1941  4 Sheets-Sheet 3

R. B. Kinzbach,
INVENTOR.
By J. Vincent Martin
and Ralph R. Browning
ATTORNEYS

June 22, 1943. R. B. KINZBACH 2,322,694
PIPE CUTTER AND REAMER
Filed Oct. 11, 1941 4 Sheets-Sheet 4

R. B. Kinzbach.
INVENTOR.

BY
J. Vincent Martin
and
Ralph R. Browning
ATTORNEYS

Patented June 22, 1943

2,322,694

UNITED STATES PATENT OFFICE 2,322,694

PIPE CUTTER AND REAMER

Robert B. Kinzbach, Houston, Tex.

Application October 11, 1941, Serial No. 414,659

16 Claims. (Cl. 164—0.7)

This invention relates to a pipe cutter and has for its general object the provision of a pipe cutter in which the pipe to be cut may be severed and other operations performed by operating the device in a relatively very simple easily understandable manner.

This invention relates particularly to that type of pipe cutter which is to be inserted into the interior of a pipe, usually a pipe in a well or in some other inaccessible locality, and then operated to sever a portion of pipe either for the purpose of removing a portion of the pipe or for the purpose of forming an opening in the pipe. Numerous pipe cutters for this purpose have been designed in the past and it is in general an object of this invention to provide an improvement over such previous pipe cutters both in simplifying the operation thereof and in providing a device which will be more sure in its operation.

Another object of this invention is to provide a cutter of the type referred to which may be operated after severing a pipe to ream down along the length of a pipe and actually remove a longitudinal section of pipe by longitudinal movement in the pipe after the initial severance of the pipe.

Another object of this invention is to provide a pipe cutter of the type referred to in which there will be an even positive and predetermined feed of the knives to severing position.

Another object of this invention is to provide a device in which the feeding of the knives may be accomplished without the use of wedges or the like.

Another object of this invention is to provide a structure in which the knives will be supported firmly on all sides so that they will not chatter or gouge during their operation but will operate smoothly at all times.

Another object of this invention is to provide both a means for retracting the knives under ordinary circumstances and in addition thereto to provide a means for retracting the knives in the event the ordinary means for that purpose should fail or it should be impossible to operate the same for any reason.

Another object of this invention is to provide a cutter of the type referred to in which it will be possible to circulate fluid through the cutter during the time it is being operated.

Another object of this invention is to provide such a cutter which may be reset for repeated operation in the hole.

Another object of this invention is to provide a cutter with a means for locating a coupling in the pipe to be cut so as to avoid having to cut through a coupling.

Another object of this invention is to provide a cutter which may be rotated during the time that it is being removed from a hole without engaging the knives with the pipe in the hole.

Other objects and advantages of this invention will become apparent from the following description taken in connection with the accompanying drawings in which is set forth by way of illustration and example certain embodiments of this invention.

In the drawings:

Fig. 1 illustrates a longitudinal cross section through the upper portion of a cutter constructed in accordance with this invention.

Fig. 2 illustrates a longitudinal cross section through the lower portion of the same cutter, this figure constituting a continuation of the lower end of Fig. 1.

Fig. 3 is similar to Fig. 2 but illustrates a longitudinal cross section through a still lower portion of the same tool, Fig. 3 constituting a continuation of the lower portion of Fig. 2.

Fig. 4 illustrates a transverse cross section taken along the line 4—4 of Fig. 1.

Fig. 5 illustrates a transverse cross section taken along the line 5—5 of Fig. 1.

Figure 16:
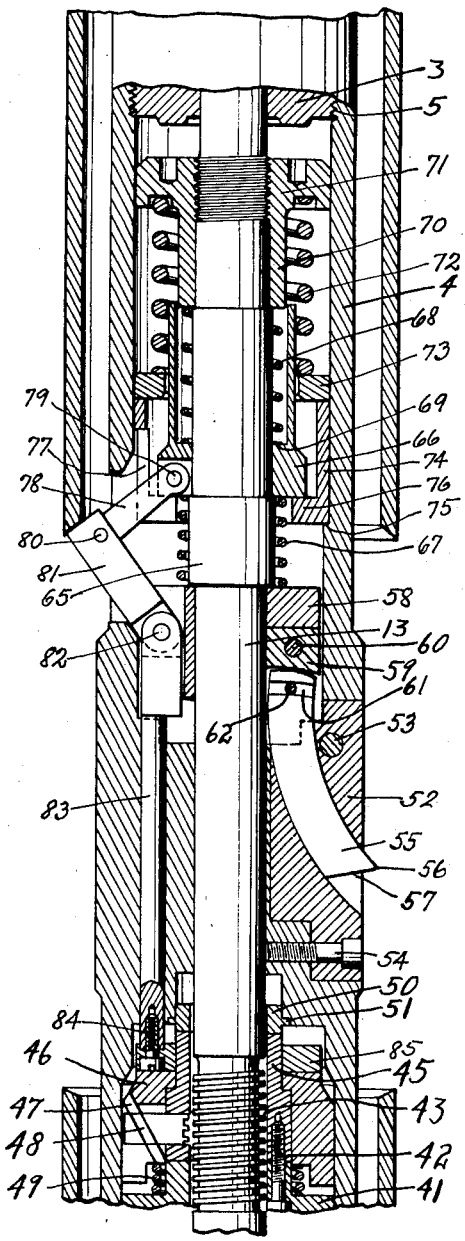
Fig. 16 is a view similar to Fig. 14 but illustrating the operation of the device in a section of pipe after it has been severed and a portion reamed away, the parts being shown in the process of being retracted.
Figure 6:
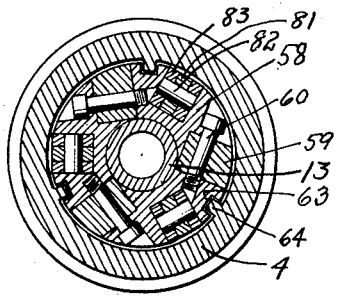
Fig. 6 illustrates a transverse cross section taken along the line 6—6 of Fig. 1.
Figure 7:
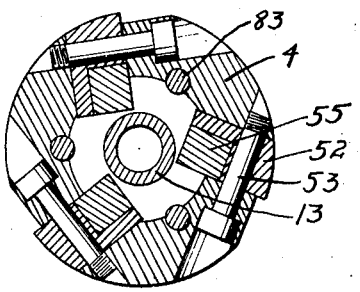
Fig. 7 illustrates a transverse cross section taken along the line 7—7 of Fig. 1.
Figure 8:
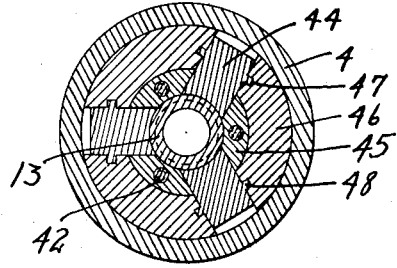
Fig. 8 illustrates a transverse cross section taken along the line 8—8 of Fig. 2.

Referring now more in detail to the drawings, the niumeral 1 designates a thread connection on the lower end portion of a pipe on which the tool is run. This pipe of course must be smaller than the pipe to be severed so that it may pass therethrough.

The pin 1 is threaded at 2 to a member 3 which forms the upper end of the composite body of the tool constructed in accordance with this invention. The main body member 4 is threaded at 5 to the fitting 3 and is in the form of a housing which contains substantially all of the moving parts of the pipe cutter. This body member 4 is internally threaded at its lower end as shown at 5 for the reception of a threaded abutment member 6. This stop member serves to hold in place the drive body 7 and to serve as a thrust bearing therefor. Leakage of gritty or dirty fluid from the well into the mechanism of the cutter between the elements 6 and 7 is guarded against by means of the packing 8. The lower end of this drive body is elongated and of tubular form and the extreme lower end is threaded at 9 to receive a nut 10 which is secured in place by means of a set screw 11, this nut 10 serving as a stop nut to prevent the drive body spring cage 12 which is slidably mounted upon this lower tubular portion of the drive body from dropping off of the lower end thereof.

Extending throughout the entire length of the cutter body is a tubular member 13 which interconnects various portions of the tool and among its other functions serves as a wash pipe for conveying fluid from within the pin member 1 down through the interior of the tool to the lower end thereof within the tubular extension of the drive body 7. Adjacent its upper end where this tubular member 13 passes through the fitting 3 a seal is formed about the tubular member by means of packing 14, this packing being held tightly in place by means of a nut 15.

The drive body spring cage 12 previously referred to is provided with bow springs 17 secured to the outer surface thereof in channels 18 provided for the purpose, these springs being secured by means of screws 19 adjacent their lower ends. The upper ends of these springs are left free. These springs are adapted to bear against the inner surface of a pipe to be cut and to frictionally hold the drive body spring cage against movement in the pipe. It will be appreciated that movement of this body within the pipe will be possible but only against the frictional resistance of the springs which may be termed the drive springs as they bear against the inner surface of the pipe to be cut.

The cage 12 is counterbored adjacent its upper end and is provided with internal acme threads 20 which are of a size to engage the outer ends of the pins 21 carried on the plungers 22 within the drive body just below the lower end of the main body of the cutter. The plungers 22 are mounted within the spring retainers 23 in which are located springs 24 that serve to urge the plungers 22 at all times radially inwardly. The amount of engagement of the threads 20 with the pins 21 is limited by means of stop pins 25 carried by the cage 12 and projected into the threaded portion 20.

The inner ends of the plungers 22 are tapered and are adapted to fit within an annular groove 26 in the outer surface of the pipe 13. It will readily be appreciated that when the wash pipe 13 has moved to such a position that the plungers 22 may enter the sockets 26, the pins 21 may move radially inwardly so that the engagement between these pins and the threads 20 will be destroyed thus permitting the cage 12 to move downwardly or to rotate with respect to the drive body.

The drive body is rotatable within the stop member 6 and when the drive body is held against rotation as when the cage 12 having the threads 20 therein is engaged with the pins 21 and the springs 17 are caused to engage the inner wall of a pipe to be cut, the body of the tool may be rotated from above without rotation of the drive body 7.

The drive body 7 is formed at its upper end with slots 27 adapted to receive projections 28 on a pinion cage 29. This pinion cage 29 has slots formed therein at spaced points about its circumference so as to receive the double pinion assembly 30. This double pinion assembly 30 includes two pinions 31 and 32 which are mounted by means of pintles 33 and 34 respectively on the opposite ends of the pinion assembly. The pintles 33 are adapted to be received in sockets provided in the lower ends of the slots in the pinion cage 29, whereas the upper pintles 34 are received in openings in a cap member 35 which is held in place on the upper end of the pinion cage 29 by means of screws 36 or the like. The pinions 31 and 32 are of very slightly different size so that while these pinions are either integral with each other or rigidly connected to each other and must therefore rotate at the same speed, the ring gears which are connected with these pinions must rotate at slightly different speeds as will hereinafter be pointed out. Various arrangements of gears and variations in the pitches thereof may of course be employed for obtaining the desired reduction.

Secured within the body member 4 by means of screws 37 or the like is a ring gear 38 adapted to mesh with the lower of the double pinions 32. Above this ring gear is a spacer 39 and rotatably mounted within the housng 4 above the spacer 39 is a second ring gear 40 which meshes with the other of the double pinions 31. This ring gear 40 is in the form of a cage 41 which is rotatable within the housing 4. It will be appreciated that when the drive body 7 is held stationary in the manner previously stated and the body 4 is rotated, the cage 29 will likewise be held stationary and through the operation of the double pinions 31 and 32 and the ring gears 38 and 40, the ring gear 40 and its cage 41 will be caused to rotate relative to the body 4.

Secured by means of screws 42 to the upper end of the cage 41 is a nut segment drive cage 43. This cage 43 has circumferentially spaced radial openings therein adapted to receive the nut segments 44 which have segmental threads formed on their inner surfaces adapted to engage the threaded external surface 45 of the wash pipe 13.

Surrounding the nut segment drive cage 43 is a nut segment tripping cage 46. This cage likewise has slots therein for receiving the outer end portions of the nut segments 44, but these slots have inclined slots 47 therein adapted to engage correspondingly inclined rails 48 on the nut segments so that when this tripping cage is moved downwardly with respect to the nut segment driving cage it will cause the retraction of the nut segments in a radially outward direction to disengage them from the threaded outer surface 45 of the wash pipe. The same result will be accomplished in the event of an upward movement of the nut segment driving cage 43, with respect to the nut segment tripping cage 46. This driving cage and the tripping cage are normally held in the position shown in Fig. 2 so as to maintain the nut segments in engagement with the threaded outer surface 45 of the wash pipe by means of a spring 49 interposed between the two cages. The driving cage 43 is normally held against upward movement within the body 4 by means of a bearing ring 50 having a shearable flange 51 thereon in engagement with an internal downwardly facing shoulder in the body 4.

From the foregoing it will be seen that by whatever amount the speed of rotation of the cage 41 differs from the speed of rotation of the body 4 when the latter is rotated, by just that amount the nut segment driving cage 43 will be rotated with respect to the wash pipe and the wash pipe will be caused to move longitudinally with respect to the remainder of the tool. The parts are so arranged that this movement of the wash pipe will be in a downward direction upon righthand rotation of the body of the tool. The wash pipe 13 is held against rotation with respect to the body of the tool by means which will presently be described.

Above that portion of the body 4 which houses the nut segments and the nut segment drive cage, the body is formed with thicker walls and is recessed at a plurality of circumferentially spaced points to receive a plurality of knife blocks 52 respectively. These knife blocks are held in place by main screws 53 extending in a substantially tangential direction with respect to the axis of the tool, and heel screws 54 which extend inwardly in a substantially radial direction with respect to the axis of the tool. The main knife block screws 53 are positioned adjacent the upper ends of the blocks 52 respectively whereas the heel screws 54 are positioned adjacent the lower ends thereof.

The knife blocks 52 each carry an arcuate knife 55. Each knife 55 is positioned in a slot in its corresponding block 52 and is so positioned that when its upper end is moved downwardly, its lower end moves outwardly in a direction to come in cutting contact with the inner wall of a pipe in which the tool may be positioned. The cutting point of this knife is designated by the numeral 56 and is adapted to cut in a radially outward direction to sever a pipe. A cutting edge 57 is also provided on the lower edge of this outer end of the knife so that after a pipe has been severed it may be milled by moving the tool bodily downwardly during the continued rotation thereof. Any one or more of the blocks 52 may be individually removed from the body of the tool by merely removing the two bolts 53 and 54 holding it in place, this operation being such that it does not require the disturbing of any other portion of the tool. For reasons hereinafter set forth however, this operation must be carried out while the knives are fully expanded to cutting position.

Immediately above the knife blocks 52 the wash pipe 13 has fixedly mounted thereon a knife thrust head 58. This knife thrust head is provided with a plurality of knife thrust blocks 59 mounted in slots formed therein and held in place by means of screws 60 provided for the purpose. There is one of these knife thrust blocks provided for each of the knives 55. The knife thrust head 58 has parts extending downwardly on either side of each of the blocks 59 below the lower end thereof, these parts embracing the upper ends of the knives 55 respectively. It will be seen that each of the knives 55 is provided with a transverse slot on each of its two opposite faces adjacent said parts of the thrust head, these slots which are designated 61 being adapted to receive the ends of short pins 62 which extend toward each other from the said parts of the thrust head.

It will be appreciated that by virtue of the arrangement just described, when the thrust head 58 is moved downwardly by a downward movement of the wash pipe, the thrust blocks 59 will bear against the upper ends of the knives 55 and force these knives downwardly and outwardly. When the wash pipe is moved upwardly thus carrying the thrust head upwardly, the engagement between the pins 62 and the slots 61 will cause the knives 55 to likewise move upwardly and be retracted.

The knife thrust head and its associated parts as well as the wash pipe are prevented from rotation within the body 4 by means of the engagement between slots 63 on the outer surface of the thrust head and splines 64 formed on the inner surface of the body.

Above the thrust head, the wash pipe is provided with an enlarged portion 65 which is adapted to receive and limit the downward movement of a trip spring cage 66. This cage is at all times urged upwardly with respect to the wash pipe by means of a spring 67 which is interposed between the thrust head 58 and the cage 66. This cage is likewise urged downwardly by means of a similar spring 68 which is disposed within the cage and bears at one end upon a part of the cage as shown at 69 and at its other end upon the lower surface of a sleeve 70 which is carried by the nut 71. This nut 71 may be known as a master spring thrust head, the master spring being disposed below this thrust head and around the sleeve 70 and being indicated at 72. The lower end of this master spring is adapted to bear upon the upper surface of a ring 73 which may be referred to as the master spring thrust ring. This ring in turn rests upon the upper end of a sleeve 74 which is held against downward movement by engagement with a shoulder 75 on the inner surface of the body 4 and which has an inwardly extending flange 76 adapted to receive the lower end of the cage 66 and limit downward movement thereof with respect to the body 4. This member is provided with cutaway portions 77 which permit the connection of the arms 78 to the cage 66 by means of pivots 79. These arms or toggle links 78 are pivotally connected at their outer ends 80 to the upper ends of a plurality of trip fingers 81 respectively. The lower ends of these trip fingers 81 are pivotally connected at 82 to the upper ends of trip bars 83. The thrust head 58 is slotted at circumferentially spaced points to permit the passage of the trip bars 83.

The lower end of each of the trip bars 83 is connected by means of a screw 84 to a trip ring 85 which in turn bears upon the upper end of the nut segment tripping cage 46 previously described.

In operation, the device is lowered into a pipe to be cut with the parts in the positions indicated in Figs. 1, 2 and 3. Of course when the lowering operation begins and the springs 17 come into contact with the pipe which is to be severed, the drive body spring cage 12 will be frictionally held against downward movement by means of said springs until the remainder of the tool moves downwardly to such an extent that it will carry this cage with it.

When the approximate position has been reached at which a cut is to be made, the string of pipe upon which the tool is being run will be rotated to the right. This rotation will tend to cause the ends of the lock pins 21 to fully engage the threads 20 until they encounter the pins 25, if they have not already been caused to so engage these threads during the downward movement of the tool into the well.

Continued righthand rotation of the string of pipe upon which the tool is carried will result in a rotation of the body member 4, but the cage 12 will be held against rotation by the springs 17 which are in engagement with the inner surface of the pipe, and the engagement between the threads 20 and the pins 21 will in a similar manner prevent rotation of the drive body 7. With the drive body 7 held stationary, the double pinion cage 29 will likewise be held against rotation. Under these circumstances, rotation of the body 4 will cause rotation of the ring gear 38 and this will result in the rotation about its own axis of the double pinion 30, 31, 32. The pinion 31 being in meshing engagement with the ring gear in the cage 41, will upon rotation cause the rotation of the cage 41. Thus, rotation of the body 4 to the right will likewise cause righthand rotation of the cage 41. However, inasmuch as the pinions 31 and 32 are of slightly different size, the pinion 31 being slightly larger than the pinion 32, the cage 41 will be caused to rotate to the right more rapidly than does the body 4. Inasmuch as the wash pipe 13 and the body 4 are being held against relative rotation by the engagement of the splines 64 with the grooves 63, that is the wash pipe is being caused to rotate with the body 4 and at the same speed as the body 4, it will be seen that the cage 41 will be rotating slightly faster than the wash pipe 13.

The nut segment drive cage is caused to rotate with the cage 41 as hereinbefore described, and inasmuch as it will be rotating at a slightly faster rate than the wash pipe, the nut segments 44 which are in threaded engagement with the wash pipe will slowly rotate about the wash pipe and cause the gradual downward movement thereof.

Now as the wash pipe begins to move downwardly, the knife thrust head 58 is moved with it and the knives 55 are moved downwardly and outwardly. At the same time, the downward movement of the wash pipe will result in the downward movement of the master spring thrust head 71 and the compression of the master spring 72. The compressive force exerted on the spring 68 will also cause the said spring to exert a downward force upon the cage 66. This downward force will be opposed by the spring 67 but as it increases, the cage 66 will move downwardly causing the trip fingers 81 to move outwardly until they bear against the inner wall of the pipe to be cut. This will take place within a relatively short downward travel of the wash pipe 13. At this point, if desired, the tool may be pulled up in the well until the trip fingers 81 engage in the space between two adjacent sections of pipe inside a collar. The trip fingers will thus catch within such space and upon further upward pull will exert a downward force upon the trip bars 83 and the trip ring 85. The nut segment tripping cage 46 will thus be moved downwardly and as it moves downwardly it will act through the tongues 47 and grooves 48 to move the nut segments 44 radially outwardly and disengage the wash pipe. Thereupon, the wash pipe will be retracted to its original position by the master spring 72. Meantime however, the engagement of the trip fingers 81 with the space between the adjacent sections of casing will have caused resistance to upward movement and will have thereby enabled the operator to locate exactly the coupling at that point so that the cutting tool may now be positioned in such a manner as to prevent the possibility of the knives coming in contact with the coupling when they are expanded in the cutting operation.

It will be understood that the operation of locating the coupling just described need not be carried out if not desired. Instead, the rotation and continued downward movement of the wash pipe may be affected by continued rotation of the tool, and when the trip fingers 81 come in contact with the inner surface of the pipe they will thereafter remain stationary as will also the cage 66, the further downward movement of the wash pipe merely serving to additionally compress the spring 68.

Figure 17:
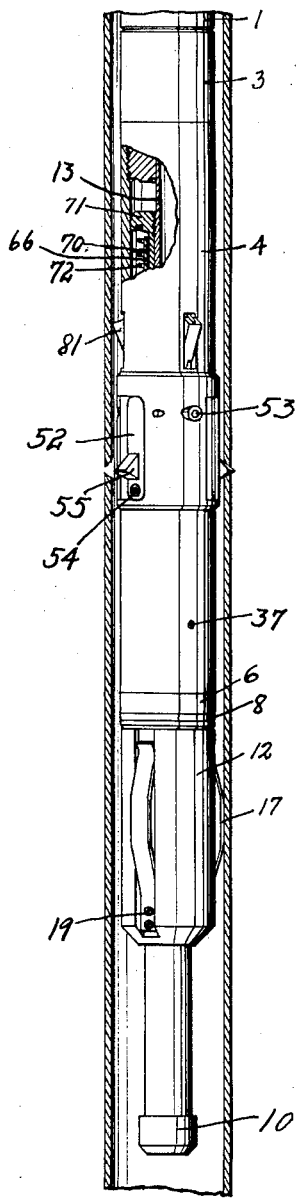
Fig. 17 is a side elevation of the entire tool illustrated on the reduced scale, parts being broken away and shown in cross section for purposes of illustration, and the tool being illustrated inside of a pipe which has just been severed, the pipe being illustrated in longitudinal cross section.
Figures 14, 15:
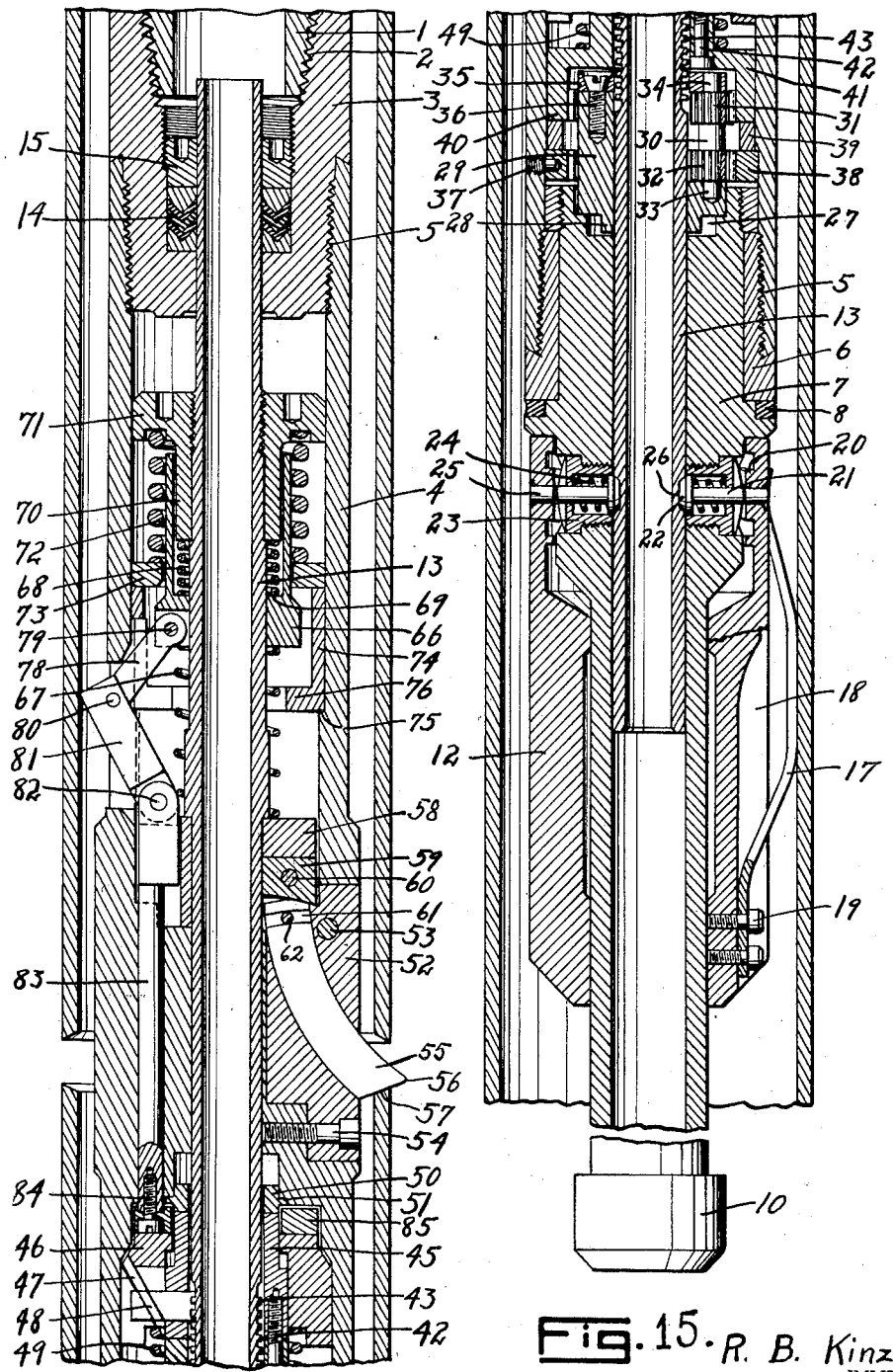
Fig. 14 illustrates the upper end portion in longitudinal cross section of the same tool as illustrated in Figs. 1 to 13 inclusive, the same being shown inside of a pipe just after the severance of the pipe has been completed, and the figure illustrating these parts in longitudinal cross section.
Fig. 15 is a view similar to Fig. 14 but illustrating the lower portion of the same tool in longitudinal cross section, Fig. 15 constituting a continuation of the lower end of Fig. 14.

When the knife has been fully expanded the pipe will have been severed as is clearly indicated in Figs. 14 and 17 respectively. When the wash pipe has moved downwardly a sufficient distance to fully expand the knives, the annular groove 26 will have moved downwardly to a position such that the heads 22 on the plungers 21 may enter the same. This allows the plungers 21 to move inwardly disengaging them from the threads. Thereafter the cage 12 may move downwardly or may rotate freely upon the body of the tool.

Figure 18:
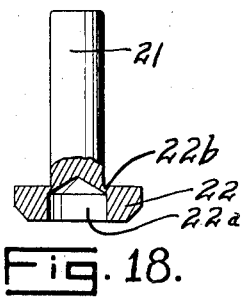
Fig. 18 is a longitudinal cross section through a plunger forming a part of the device.
Figure 9:
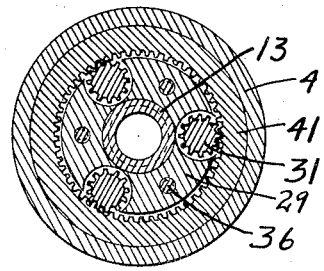
Fig. 9 illustrates a transverse cross section taken along the line 9—9 of Fig. 2.
Figure 10:
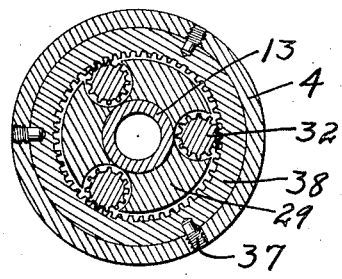
Fig. 10 illustrates a transverse cross section taken along the line 10—10 of Fig. 2.
Figure 12:
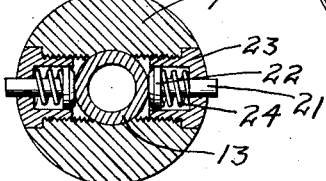
Fig. 12 illustrates a transverse cross section taken along the line 12—12 of Fig. 2.
Figure 11:
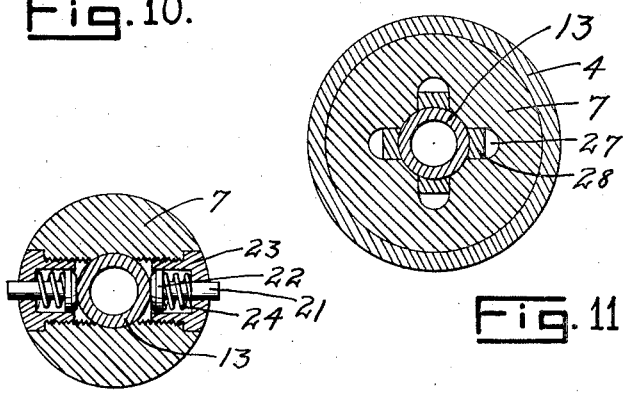
Fig. 11 illustrates a transverse cross section taken along the line 11—11 of Fig. 2.
Figure 13:
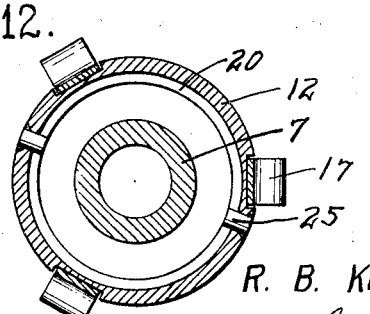
Fig. 13 illustrates a transverse cross section taken along the line 13—13 of Fig. 3.

The operator may then continue to rotate the tool and gradually feed it downwardly as indicated in Fig. 14 so as to mill away a section of the casing and leave a zone of open hole as indicated clearly in Fig. 16. When the trip fingers 81 pass the lower end of the pipe which has been severed and is being milled away they will move outwardly until the cage 66 strikes against the flange 76 as shown in Fig. 16. When the milling operation has been completed the tool may be pulled upwardly until these trip fingers engage the lower end of the severed section of pipe, whereupon the entire device will be tripped and the wash pipe moved back to its original position in the manner above described. After the wash pipe has moved back to its original position retracting the knives, the tool may be lowered slightly to release the engagement between the trip fingers 81 and the severed section of pipe, whereupon the spring 67 will force the cage 66 upwardly and retract the trip fingers 81. The tool may then be moved to another point in the hole for another cut or may be removed from the hole as desired. When the tool is moved upwardly during the tripping and resetting operation the cage 12 will normally remain stationary in the pipe which has been severed and the body will move upwardly until the pins 21 are above the threaded section 20 so that the pins may freely move outwardly as the depression 26 in the wash pipe moves upwardly. However, in the event the upward movement of the tool is insufficient to remove the pins 21 from the threads 20 and in the event one of the threads 20 should overlie one of the pins 21 in such a way as to prevent it from moving outwardly when the wash pipe moves upwardly, the pin is so constructed that the head may move outwardly without moving the pin 21 outwardly. This construction is illustrated in Fig. 18 of the drawings in which it will be seen that there is a bore 22a nearly all the way through the head, this bore being of slightly larger diameter than the pin 21 so that the head may be forced to telescope over the pin by shearing the metal between the pin and the bore 22a at the point 22b. Of course if it becomes necessary to so fracture the plungers 21, it will be necessary to replace these plungers before the tool can again be used.

In the event a cut is made such as illustrated in Fig. 14 and it is not desired to mill down along the pipe or for some reason it becomes impossible to so mill down along the pipe, the retraction of the mechanism may be caused by placing an excessive amount of weight on the device. This downward weight on the device will cause the section of severed pipe below the knives 55 to exert a strong upward force upon these knives. This upward force will push the wash pipe 13 upwardly until the flange 51 on the bearing ring 50 is sheared off thus permitting this bearing ring to move upwardly within the body of the tool. The upward movement of this bearing ring will permit the upward movement of the nut segment cage 45 together with the nut segments and these parts will be moved upwardly by upward movement of the wash pipe. As the said parts are moved upwardly with respect to the body of the tool, the engagement between the tongues 47 and the grooves 46 will cause the outward movement of the nut segments 44 thus disengaging these segments from the wash pipe and permitting the upward movement of the wash pipe to its original position.

Of course after the parts have been retracted in the manner just described it will be necessary to remove the tool from the hole and to replace the ring 50 before any further cutting operations can be carried out because the nut segments will have been permanently retracted out of engagement with the threaded section of the wash pipe.

Regardless of how the knives may be caused to retract, the operator, by rotating the tool a few turns to the left after retracting the knives, make certain that the cage 12 is disengaged from the pins 21. Then when the tool is moved upwardly in pulling it out of the well the cage 12 will rest on the nut 10 and may rotate freely with respect to the body of the tool without causing any expansion of the knives or the projection of any of the other parts. This makes it possible to spin with the rotary table the tool and the pipe on which it is carried so as to easily disconnect sections of pipe from the upper end thereof while coming out of the hole, without danger of expanding the knives or otherwise causing danger.

It will be apparent from the foregoing that a means has been provided for cutting and reaming pipe which is fully capable of carrying out all of the objects and accomplishing all of the results sought by this invention.

Having described my invention, I claim:

1. In a pipe cutter, a body, a knife mounted in the body for outward radial movement with respect to the body to engage a pipe to be cut, an actuating member movable in said body, an epicyclic gear train for causing movement of said actuating member upon rotation of said body, and means for transmitting the movement of said actuating member to said knife to cause radial movement thereof.

2. In a pipe cutter, a body, a knife mounted in the body for outward radial movement with respect to the body to engage a pipe to be cut, an actuating member movable in said body, means for causing movement of said actuating member upon initial rotation of said body and releasable upon predetermined movement of said actuating member to permit further rotation of said body without additional movement of said actuating member, and means for transmitting said predetermined movement of the actuating member to said knife to cause radial movement thereof.

3. In a pipe cutter, a body, a knife mounted on the body for outward radial movement with respect to the body to engage a pipe to be cut, a conduit extending through said body for conducting a flow of fluid therethrough and movable therein, means forming a seal between said body and said conduit adjacent the upper end thereof to direct flow of fluid from above said body into said conduit and prevent the same from flowing into said body around said conduit, means for causing movement of said conduit in said body, and means for transmitting the movement of said conduit to said knife to cause radial movement thereof.

4. In a pipe cutter, a body having an arcuate socket provided therein extending from a region within said body first downwardly and then radially outwardly and opening in the outer side surface of said body, an arcuate knife mounted in said socket for movement along a circular path defined by said socket and having its center of curvature located outside said body so that when the upper end of said knife is moved downwardly along said circular path the lower and outer end of said knife will be moved outwardly along said arcuate path to engage a pipe to be cut, an actuating member movable longitudinally in said body, means for causing longitudinal movement of said member, and a means on said member having parts in engagement with the upper end of said knife for transmitting the longitudinal movement of said member to said knife to cause said knife to move along its arcuate path so that its lower and outer end will move outwardly to engage a pipe to be cut.

5. In a pipe cutter, a body, a knife mounted in the body for outward radial movement with respect to the body to engage a pipe to be cut, an actuating member movable in said body, means for causing movement of said actuating member in said body upon rotation of said body, said last mentioned means including a releasable clutch, means for releasing said clutch by longitudinal movement of said body in a pipe, means for returning said actuating means to its original position upon release of said clutch, and means for transmitting movement of said actuating member to said knife to cause radial movement thereof.

6. In a pipe cutter, a body, a plurality of knife carrying blocks adapted to be received into said body, means independently removably securing each block in said body, and a knife carried by each block and movable radially outwardly with respect to said body when said block is in place in said body, whereby each knife and the block carrying the same may be independently removed from said body and replaced 7. In a pipe cutter, a body, a knife mounted in the body for outward radial movement with respect to the body to engage a pipe to be cut, an actuating member movable longitudinally in said body, resilient means for normally urging said member in one direction with respect to said body, means for driving said member longitudinally in the opposite direction with respect to said body upon rotation of said body, said last means including a releasable driving clutch, a tripper finger movable outwardly with respect to said body, means actuated by the longitudinal movement of said member in said last named direction for urging said tripper finger resiliently outwardly, and means connecting said tripper finger with said driving clutch, whereby when said body is pulled upwardly to engage said tripper finger with an abutment in a pipe in which the tool is located, the downward movement of said finger with respect to said body will cause disengagement of said clutch and will permit said resilient means to move said member in said first named direction, means for causing longitudinal movement of said member in said second named direction to be transmitted to said knife to cause radial movement thereof, and for causing longitudinal movement of said member in said first named direction to retract said knife.

8. In a pipe cutter, a body, a knife mounted in the body for outward radial movement with respect to the body to engage a pipe to be cut, an actuating member movable longitudinally in said body, means for causing longitudinal movement of said member, means for transmitting the longitudinal movement of said member to said knife to cause radial movement thereof, said means for causing longitudinal movement of said member including means in said body threadedly engaging said member, an epicyclic gear train in said body in engagement with said means and with said body, and means adapted to hold a portion of said epicyclic gear train against rotation during rotation of said body and said member, whereby said epicyclic gear train will operate to move said member longitudinally with respect to said body.

9. In a pipe cutter, a body, a knife mounted in the body for outward radial movement with respect to the body to engage a pipe to be cut, an actuating member movable in said body, means for causing movement of said member upon rotation of said body, said means comprising an epicyclic gear train having one portion in engagement with said body, another portion in engagement with a part on said member to drive said member upon rotation of said body, and a cage portion, and means for holding said cage portion against rotation during rotation of said body, and means for transmitting the movement of said member to said knife to cause radial movement thereof.

10. In a pipe cutter, a body, a knife mounted in the body for outward radial movement with respect to the body to engage a pipe to be cut, an actuating member movable in said body, an epicyclic gear train for moving said member with respect to said body upon rotation of said body, a releasable driving clutch connecting said epicyclic gear train to said member, and means for transmitting the movement of said member to said knife to cause radial movement thereof.

11. In a pipe cutter, a body, a knife mounted in the body for outward radial movement with respect to the body to engage a pipe to be cut, an actuating member movable in said body, means for causing longitudinal movement of said member including an epicyclic gear train connected to said body and to said member, a releasable clutch interposed between said epicyclic gear train and said member, means for transmitting the longitudinal movement of said member to said knife to cause radial movement thereof, and frangible means normally preventing the release of said releasable clutch, said frangible means adapted to be fractured by an excessive upward force against said knife when partially or wholly expanded.

12. In a pipe cutter, a body, a knife mounted in the body for outward radial movement with respect to the body to engage a pipe to be cut, an actuating member movable in said body, means for causing movement of said member, said means including an epicyclic gear train connecting said body and said member, friction means for holding a portion of said epicyclic gear train against rotation during rotation of said body to cause said epicyclic gear train to drive said member and cause movement of the same with respect to said body, means for connecting said holding means to said epicyclic gear train upon rotation of said body in one direction and for releasing the same from said epicyclic gear train upon rotation of said body in the opposite direction, and means for transmitting the movement of said member to said knife to cause radial movement thereof.

13. In a pipe cutter, a body, a knife mounted in the body for outward radial movement with respect to the body to engage a pipe to be cut, an actuating member movable in said body, means for causing movement of said member, said last means including an epicyclic gear train connected to said body and to said member, means for holding a portion of said epicyclic gear train against rotation during rotation of said body, whereby rotation of said body will act through said gear train to cause movement of said member, means for connecting said holding means to said epicyclic gear train upon rotation of said body in one direction and for disconnecting said holding means from epicyclic gear train upon rotation of said body in the opposite direction, means for automatically releasing said holding means from said epicyclic gear train when said member has moved to the extent of its intended travel, and means for transmitting the longitudinal movement of said member to said knife to cause radial movement thereof.

14. In a pipe cutter, a body, a knife mounted in the body for outward radial movement with respect to the body to engage a pipe to be cut, a conduit extending through said body for conducting a flow of fluid therethrough and movable therein, an epicyclic gear train connecting said body and said conduit for causing movement of said conduit with respect to said body, a cage carried by said apparatus and having parts frictionally engaging the walls of a pipe to be cut to tend to hold said cage stationary therein, said cage having a threaded portion adjacent its upper end, a plurality of pins having their inner ends bearing against the exterior of said conduit and their outer ends normally projecting to an extent to be engaged by said threaded portion of the cage, means nonrotatably connected to a portion of said epicyclic gear train and serving as a mounting for said pins, whereby the threads of said cage may be engaged with said pins to the full extent of the possible threaded engagement to prevent rotation of a part of said epicyclic gear train and cause said epicyclic gear train to transmit movement from said body to said conduit, a depression in the exterior surface of said conduit adapted to register with said pins when said conduit has traveled the full extent of its intended movement, and means for urging said pins into said depression to release said pins from their threaded engagement with said cage and means for transmitting the longitudinal movement of said conduit to said knife to cause radial movement thereof.

15. In a pipe cutter, a body, a knife mounted in the body for outward radial movement with respect to the body to engage a pipe to be cut, an actuating member movable in said body, an epicyclic gear train connecting said body and said actuating member for causing movement of said actuating member with respect to said body, a cage carried by said apparatus and having parts frictionally engaging the walls of a pipe to be cut to tend to hold said cage stationary therein, said cage having a threaded portion adjacent its upper end, a plurality of pins having their inner ends bearing against the exterior of said actuating member and their outer ends normally projecting to an extent to be engaged by said threaded portion of the cage, said pins consisting of two telescoping parts frangibly connected together in extended relation to each other, means nonrotatably connected to a portion of said epicyclic gear train and serving as a mounting for said pins, whereby the threads of said cage may be engaged with said pins to the full extent of possible threaded engagement to prevent rotation of a part of said epicyclic gear train and cause said epicyclic gear train to transmit movement from said body to said actuating member, a depression in the exterior surface of said actuating member adapted to register with said pins when said actuating member has traveled the full extent of its intended movement, and means for urging said pins into said depression to release said pins from their threaded engagement with said cage, and means for transmitting the longitudinal movement of said actuating member to said knife to cause radial movement thereof.

16. In a pipe cutter, a body, a plurality of knife carrying blocks adapted to be received into said body, means independently removably securing each block in said body, each block having an arcuate socket provided therein opening radially outwardly of the body, and an arcuate knife in the arcuate socket of each block and movable radially outwardly in an arcuate path defined by said socket when said block is in place in said body, whereby each knife and the block carrying the same may be independently removed from said body and replaced.

ROBERT B. KINZBACH.